United States Patent
Chang et al.

(10) Patent No.: US 7,436,455 B2
(45) Date of Patent: Oct. 14, 2008

(54) DE-INTERLACING DEVICE HAVING A PATTERN RECOGNIZING UNIT AND METHOD THEREFOR

(75) Inventors: Fung-Jane Chang, Tainan County (TW); Ling-Shiou Huang, Tainan County (TW); Jiunn-Yau Huang, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 478 days.

(21) Appl. No.: 11/102,829

(22) Filed: Apr. 11, 2005

(65) Prior Publication Data

US 2005/0237428 A1 Oct. 27, 2005

(30) Foreign Application Priority Data

Apr. 23, 2004 (TW) .............................. 93111540 A

(51) Int. Cl.
*H04N 11/20* (2006.01)
(52) U.S. Cl. .................. 348/448; 348/441; 348/452

(58) Field of Classification Search ............... 348/448, 348/449–452, 441, 445–446, 554–558, 699–700; H04N 11/20
See application file for complete search history.

(56) References Cited

U.S. PATENT DOCUMENTS

| 7,057,665 | B2* | 6/2006 | Jung et al. | 348/452 |
| 7,176,977 | B2* | 2/2007 | Zhu et al. | 348/448 |
| 7,202,907 | B2* | 4/2007 | Chow | 348/441 |
| 2004/0114048 | A1* | 6/2004 | Jung et al. | 348/441 |

FOREIGN PATENT DOCUMENTS

| CN | 1173776 A | 2/1998 |
| CN | 1536876 A | 10/2004 |

* cited by examiner

Primary Examiner—Trang U Tran
(74) Attorney, Agent, or Firm—Rabin & Berdo, P.C.

(57) ABSTRACT

A de-interlacing device having a pattern recognizing unit and a method therefor for receiving an interlaced image and outputting a non-interlaced image. The de-interlacing device includes a first de-interlacing unit, a second de-interlacing unit and a pattern recognizing unit. The pattern recognizing unit receives the interlaced image, recognizes whether or not the interlaced image has an obviously horizontal pattern, outputting the interlaced image to the first de-interlacing unit if yes, and outputting the interlaced image to the second de-interlacing unit if not. The first de-interlacing unit and the second de-interlacing unit use different de-interlacing methods. The first or second de-interlacing unit receives the interlaced image outputted from the pattern recognizing unit and outputs the non-interlaced image accordingly.

17 Claims, 10 Drawing Sheets

DE-INTERLACING DEVICE HAVING A PATTERN RECOGNIZING UNIT AND METHOD THEREFOR

This application claims the benefit of Taiwan application Serial No. 93111540, filed Apr. 23, 2004, the subject matter of which is incorporated herein by reference.

BACKGROUND OF THE INVENTION

1. Field of the Invention

The invention relates to a de-interlacing device and a method therefor, and more particularly to a de-interlacing device having a pattern recognizing unit and a method therefor.

2. Description of the Related Art

The typical film is shot and played in an interlaced manner. In a television, for example, the playing procedures of one frame thereof include a playing procedure of an odd field and a playing procedure of an even field. The odd field is composed of the odd-numbered display lines of the frame, and the even field is composed of the even-numbered display lines of the frame.

The refresh rate of the typical television is 30 Hz. That is, 30 frames are played in one second. Each frame are played with the odd field and the even field, so 60 fields are played in one second.

Because the requirement on the image quality is getting higher and higher and the quality of the non-interlaced (also called as progressive) image is better than that of the interlaced image, the more advanced image playing device, such as a high-definition television (High Definition TV, HDTV), has the progressive playing function.

If the interlaced image is to be played in the non-interlaced manner, the interlaced frame has to be de-interlaced into a complete frame, which is then played. FIG. 1A is a schematic illustration showing an interlaced image, which includes a (n−1)-th field, an n-th field and a (n+1)-th field. In the example of FIG. 1A, descriptions are made with reference to the pixels having the x coordinates of (i−1) to (i+1) and the y coordinates of (j−1) to (j+1). Each field of the interlaced image only includes the odd-numbered or even-numbered horizontal lines to be displayed. So, only the pixels in the odd-numbered or even-numbered horizontal lines have effective values in each field, wherein the pixels marked with "X" represents that the no effective luminance value exists in this field. De-interlacing the interlaced image is to fill proper luminance values into the pixels without effective luminance values in each field. Taking the time average method as an example, the luminance value of the pixel (i,j) in the non-interlaced n-th frame may be the average of the luminance values of the pixel (i,j) of the interlaced image in the (n−1)-th and (n+1)-th fields. According to the above-mentioned method, the n-th frame of the non-interlaced image may be obtained, as shown in FIG. 1B.

However, the de-interlacing method tends to cause errors in the displayed image because the two fields of the interlaced image are shot at different time instants, and the image quality cannot be enhanced until the image is further processed.

SUMMARY OF THE INVENTION

It is therefore an object of the invention to provide a de-interlacing device for enhancing the image quality and a method for the de-interlacing device.

The invention achieves the above-identified object by providing a de-interlacing device for receiving an interlaced image and outputting a non-interlaced image. The device includes a first de-interlacing unit, a second de-interlacing unit and a pattern recognizing unit. The pattern recognizing unit receives the interlaced image, recognizes whether or not the interlaced image has an obviously horizontal pattern, outputs the interlaced image to the first de-interlacing unit if yes, and outputs the interlaced image to the second de-interlacing unit if not. The first de-interlacing unit and the second de-interlacing unit use different de-interlacing methods. The first or second de-interlacing unit receives the interlaced image outputted from the pattern recognizing unit and then outputs the non-interlaced image.

The invention also achieves the above-identified object by providing a de-interlacing method for converting an interlaced image into a non-interlaced image. First, a field of the interlaced image is received, wherein the field includes a first horizontal line and a second horizontal line. Next, whether or not the field has an obviously horizontal pattern is recognized by checking a vertical differential level between the first horizontal line and the second horizontal line and checking a horizontal differential level between the first horizontal line and the second horizontal line. The field has the obviously horizontal pattern and the field is de-interlaced using a first method if the vertical differential level is large enough and the horizontal differential level is not large enough; or otherwise the field is de-interlaced using a second method.

Other objects, features, and advantages of the invention will become apparent from the following detailed description of the preferred but non-limiting embodiments. The following description is made with reference to the accompanying drawings.

DETAILED DESCRIPTION OF THE INVENTION

The typical frame may have a complicatedly changing pattern or a horizontally changing pattern. If such a frame has to be de-interlaced, different de-interlacing methods have to be applied to the two patterns. However, the typical de-interlacing device only utilizes the same de-interlacing method such that the image quality is poor.

Figure 1A:
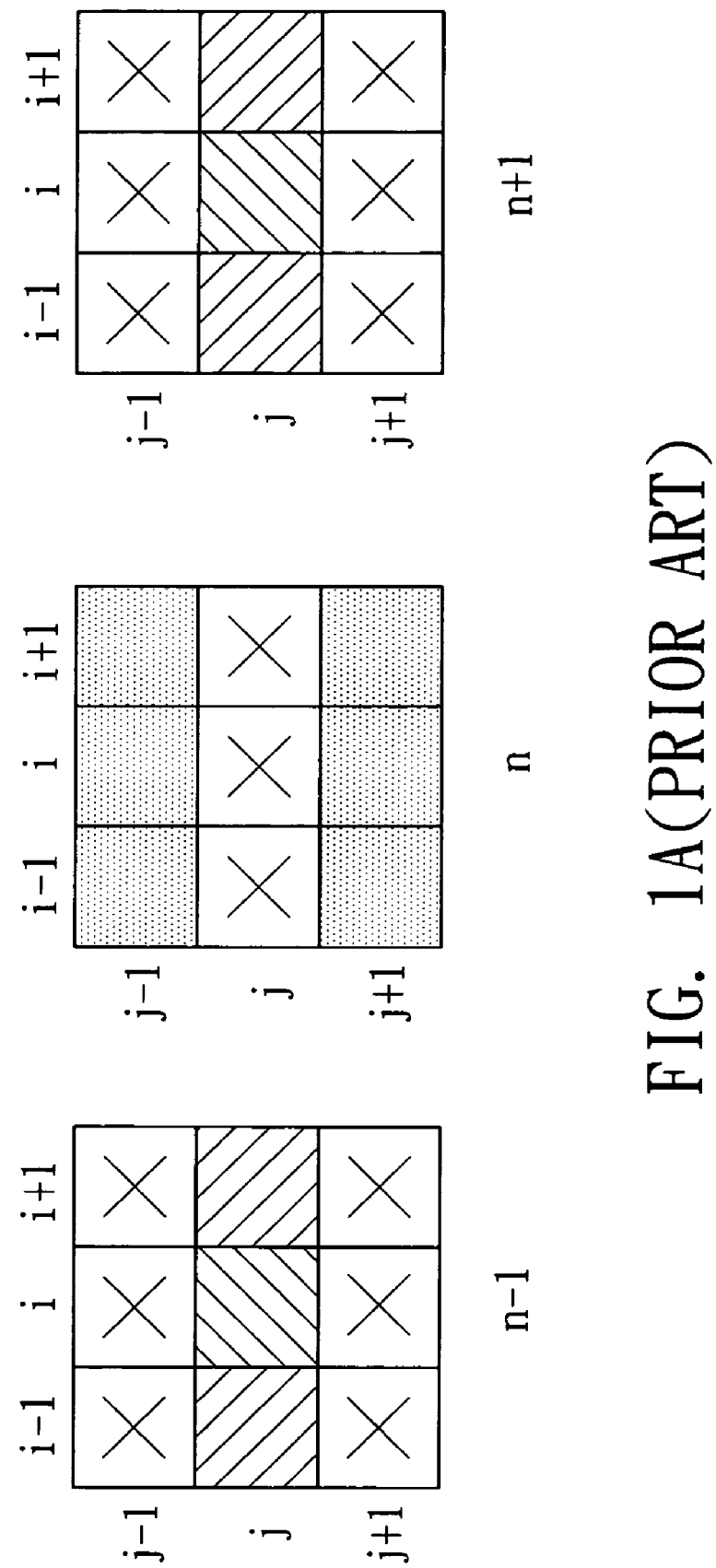
FIG. 1A is a schematic illustration showing an interlaced image.
Figure 1B:
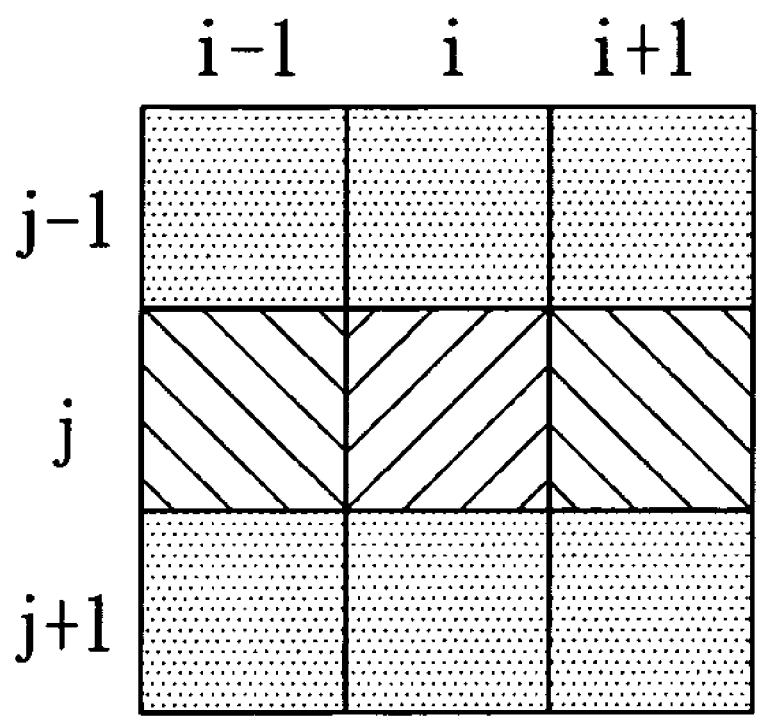
FIG. 1B shows an n-th frame of the non-interlaced image.
Figure 2A:
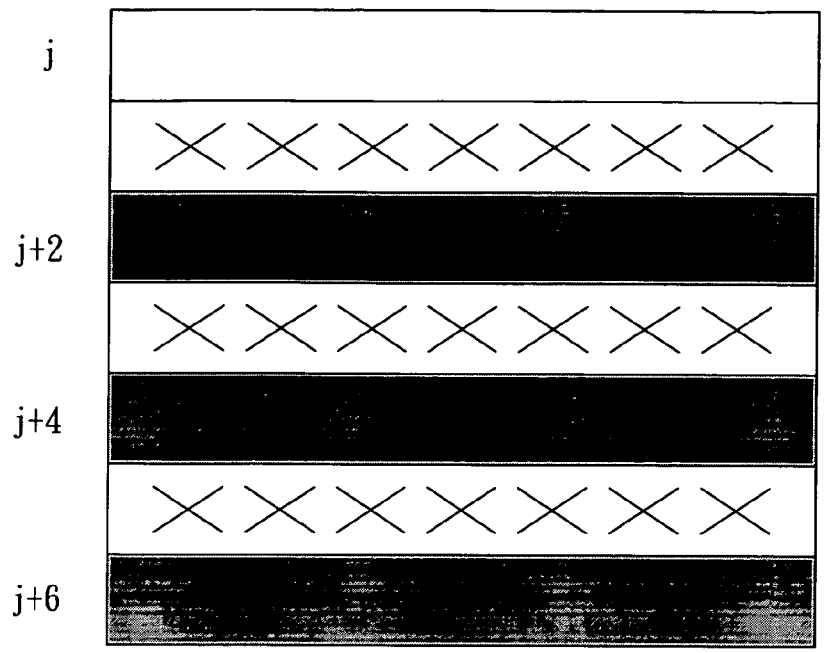
FIG. 2A shows a pattern that changes complicatedly.
Figure 2B:
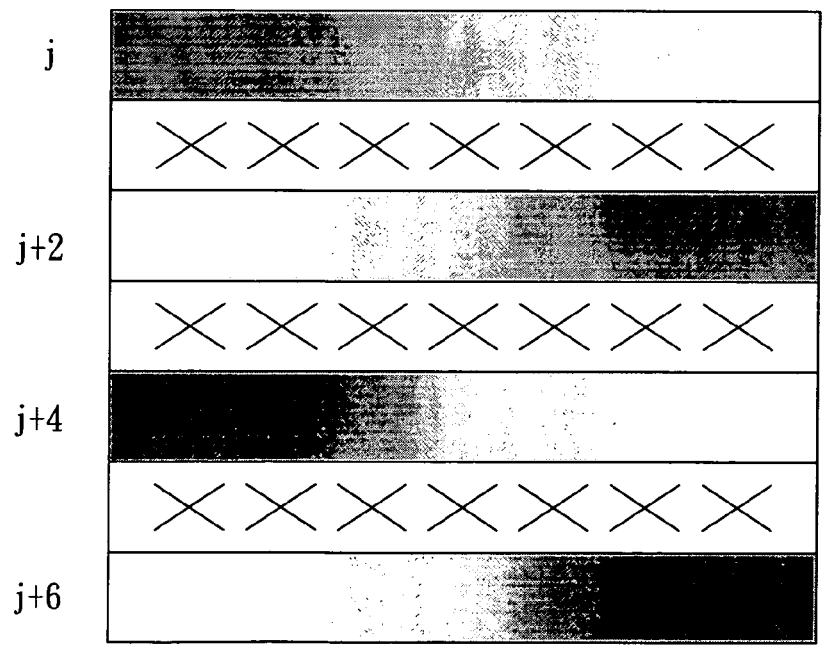
FIG. 2B shows a pattern that changes horizontally.

The horizontally changing pattern may be divided into an obviously horizontal pattern and a gradient horizontal pattern. FIG. 2A shows an obviously horizontal pattern, and FIG. 2B shows a gradient horizontal pattern. These two patterns should be de-interlaced using special de-interlacing methods so that good image quality may be obtained. However, the same method, such as the ELA (Edge based Line Average) algorithm, is utilized regardless of the kinds of the patterns in the prior art. Thus, it is difficult to obtain the good image quality.

Figure 3:
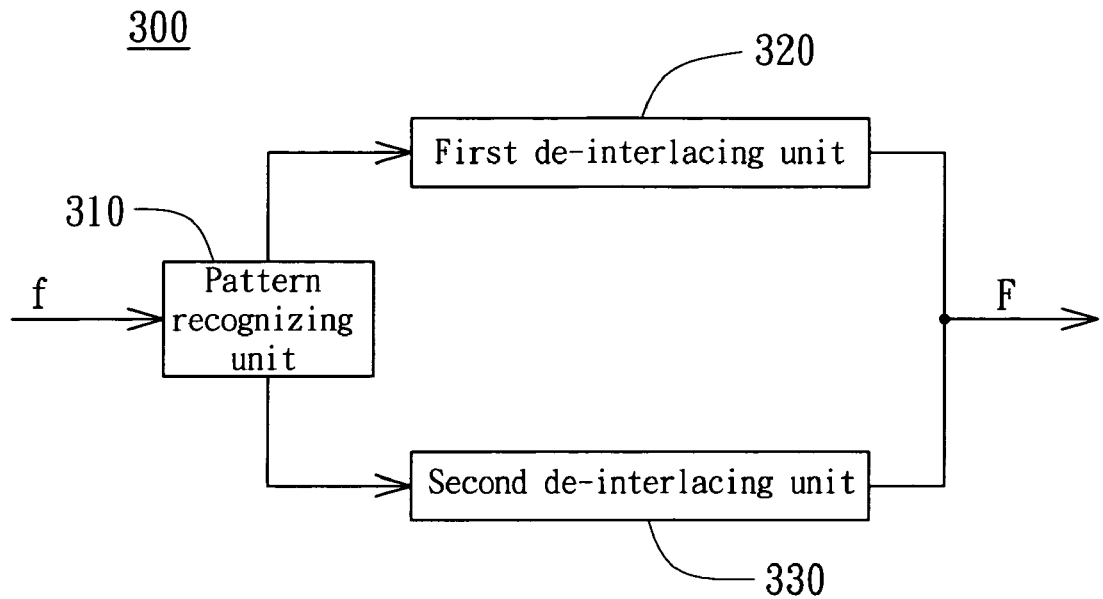
FIG. 3 is a block diagram showing a de-interlacing device according to a first preferred embodiment of the invention.

FIG. 3 is a block diagram showing a de-interlacing device according to a first preferred embodiment of the invention. Referring to FIG. 3, the de-interlacing device 300 includes a pattern recognizing unit 310, a first de-interlacing unit 320 and a second de-interlacing unit 330. The pattern recognizing unit 310 receives the field f, which is an interlaced image. If the pattern recognizing unit 310 recognizes that the field f has the horizontal pattern of FIG. 2A or 2B and the field f is processed by the first de-interlacing unit 320; or otherwise the field f is processed by the second de-interlacing unit 330. The horizontal patterns to be processed by the first de-interlacing unit 320 include an obviously horizontal pattern, which greatly changes vertically but slightly changes horizontally, and a gradient horizontal pattern, in which two adjacent horizontal lines gradually change in a reverse manner.

The first de-interlacing unit 320 receives the pixel data of the field f outputted from the pattern recognizing unit 310, and then generates a corresponding de-interlaced image or corresponding de-interlaced pixel data accordingly. The second de-interlacing unit 330 receives the pixel data of the field f outputted from the pattern recognizing unit 310, and then generates a corresponding de-interlaced image or corresponding de-interlaced pixel data. The first de-interlacing unit 320 and the second de-interlacing unit 330 utilize different de-interlacing methods.

It is to be noted that instead of all the pixels in the field f, the pattern recognizing unit 310 may also receive a portion of pixels in the field f, which can be used to recognize the horizontal pattern.

Consequently, the invention further discloses a de-interlacing method for generating a corresponding de-interlaced image or corresponding de-interlaced pixel data according to the pixel data of the field f. The method includes the following steps. First, it is recognized that whether or not the pixel data of the field f has a horizontal pattern. If the pixel data of the field f has the horizontal pattern, the pixel data of the field f is de-interlaced into the corresponding de-interlaced image or corresponding de-interlaced pixel data according to a first de-interlacing method; or otherwise the pixel data of the field f is de-interlaced into the corresponding de-interlaced image or corresponding de-interlaced pixel data according to a second de-interlacing method, which is different from the first de-interlacing method. The method for recognizing whether the pixel data of the field f has the horizontal pattern is described with reference to FIGS. 4, 5 and 6A to 6D.

Figure 4:
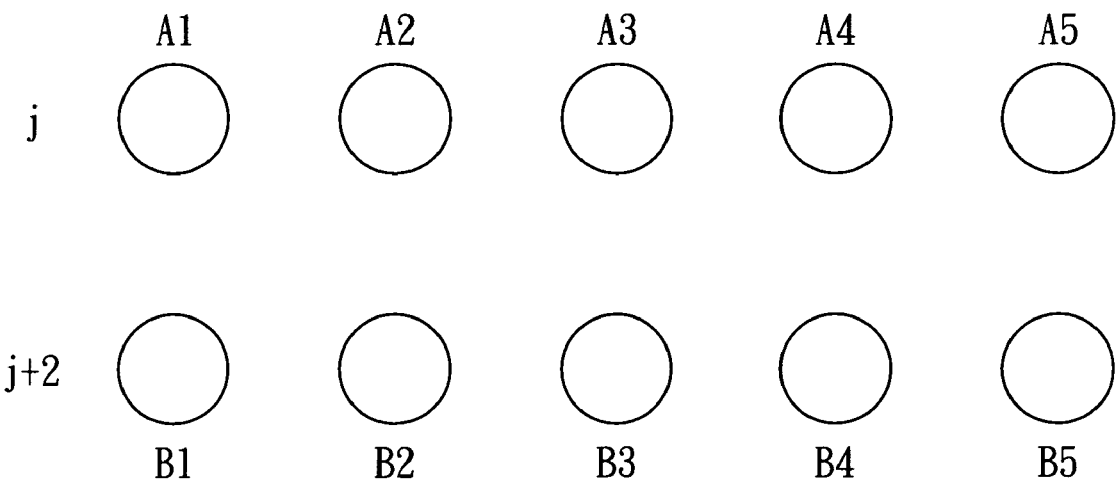
FIG. 4 is a schematic illustration showing a field f.
Figure 5:
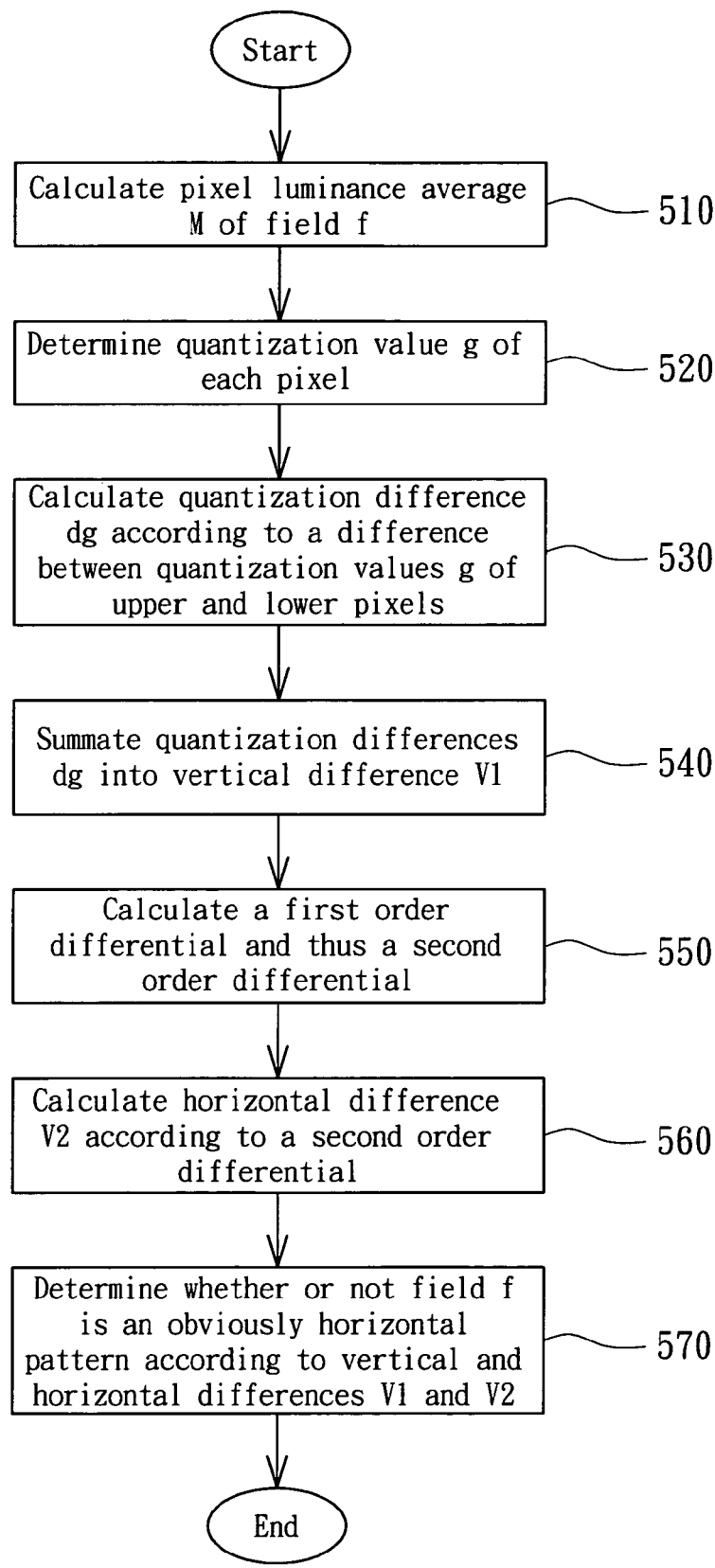
FIG. 5 is a flow chart showing a method for recognizing an obviously horizontal pattern according to the embodiment of the invention.

FIG. 4 is a schematic illustration showing a field f. In this embodiment, the field f includes A1 to A5 pixels of a j-th horizontal line and B1 to B5 pixels of a (j+2)-th horizontal line, wherein the (j+1)-th horizontal line is not included in the field f and is not shown accordingly. FIG. 5 is a flow chart showing a method for recognizing an obviously horizontal pattern according to the embodiment of the invention. First, the vertical difference between the upper and lower lines in the vertical direction is calculated, as shown in steps 510 to 540. Next, the horizontal difference in the horizontal direction is calculated, as shown in steps 550 to 560. Finally, it is determined that whether or not the field f has the obviously horizontal pattern according to the vertical difference and the horizontal difference (step 570). If the vertical difference is large and the horizontal difference is small, the field f has the obviously horizontal pattern.

In the step of calculating the vertical difference between the upper and lower lines in the vertical direction, a luminance average M of all pixels in the field f, which is also the average of the luminance values of the pixels A1 to A5 and B1 to B5, is first calculated (step 510).

Next, each luminance value is quantized into a quantization value g of each pixel according to the average M (step 520). If the luminance value of the pixel is larger than a sum of the luminance average M and the threshold value T1, the quantization value g of this pixel is 1. If the luminance value of the pixel is smaller than a difference obtained by subtracting the threshold value T1 from the luminance average M, the quantization value g of this pixel is −1. Otherwise, the quantization value of this pixel is 0. For example, if the average M of these pixels are 50 and the threshold value T1 is 20, the quantization value g of the pixel with the luminance value greater than 70 is 1; the quantization value g of the pixel with the luminance value smaller than 30 is −1; and the quantization value g of the pixel with the luminance value ranging from 30 to 70 is 0.

Furthermore, a quantization difference dg of the pixels of the upper and lower lines is obtained (step 530). That is, a difference dg1 between the quantization values g of the pixels A1 and B1, a difference dg2 between the quantization values g of the pixels A2 and B2, a difference dg3 between the quantization values g of the pixels A3 and B3, a difference dg4 between the quantization values g of the pixels A4 and B4, and a difference dg5 between the quantization values g of the pixels A5 and B5 are firstly obtained. Then the quantization differences dg1 to dg5 are summated into a vertical difference V1 (step 540), which represents the vertical differential level of the pixels of the upper and lower lines.

In the process of calculating the horizontal difference, a first order differential between each pixel and its horizontal adjacent pixel i is firstly calculated, and a second order differential is also calculated accordingly (step 550). In the process of calculating the first order differential, the luminance difference between the pixels A1 and A2 is calculated to obtain the first order differential d12, a luminance difference between the pixels A2 and A3 is calculated to obtain the first order differential d23, the luminance difference between the pixels A3 and A4 is calculated to obtain the first order differential d34, the luminance difference between the pixels A4 and A5 is calculated to obtain the first order differential d45, and first order differentials e12, e23, e34 and e45 between pixels B1, B2, B3, B4 and B5 are calculated. Then, the second order differential is calculated according to the first order differential. The second order differential D1 is a difference between the first order differentials d12 and d23, the second order differential D2 is a difference between the first order differentials d23 and d34, and the second order differential D3 is a difference between the first order differentials d34 and d45. Similarly, the second order differentials E1, E2 and E3 between the pixels B1 to B5 may be obtained.

Then, the second order differentials are summated into a horizontal difference V2, which represents a horizontal differential level of the field f.

In step 570, it is determined that whether or not the field f has the obviously horizontal pattern according to the vertical difference V1 and the horizontal difference V2. If the vertical difference is large and the horizontal difference is not large, the field f has an obviously horizontal pattern. The method of this embodiment is to multiply the vertical difference V1 by a predetermined value to obtain a product and then to subtract the horizontal difference V2 from the product. If the subtraction result is greater than zero, it represents that the field f has the obviously horizontal pattern. In this embodiment, the predetermined value ranges from 3.8 to 4.2. If the field f has the obviously horizontal pattern, the field is processed by the first de-interlacing unit 320; or otherwise the recognition of the gradient horizontal pattern is performed.

Figure 6A:
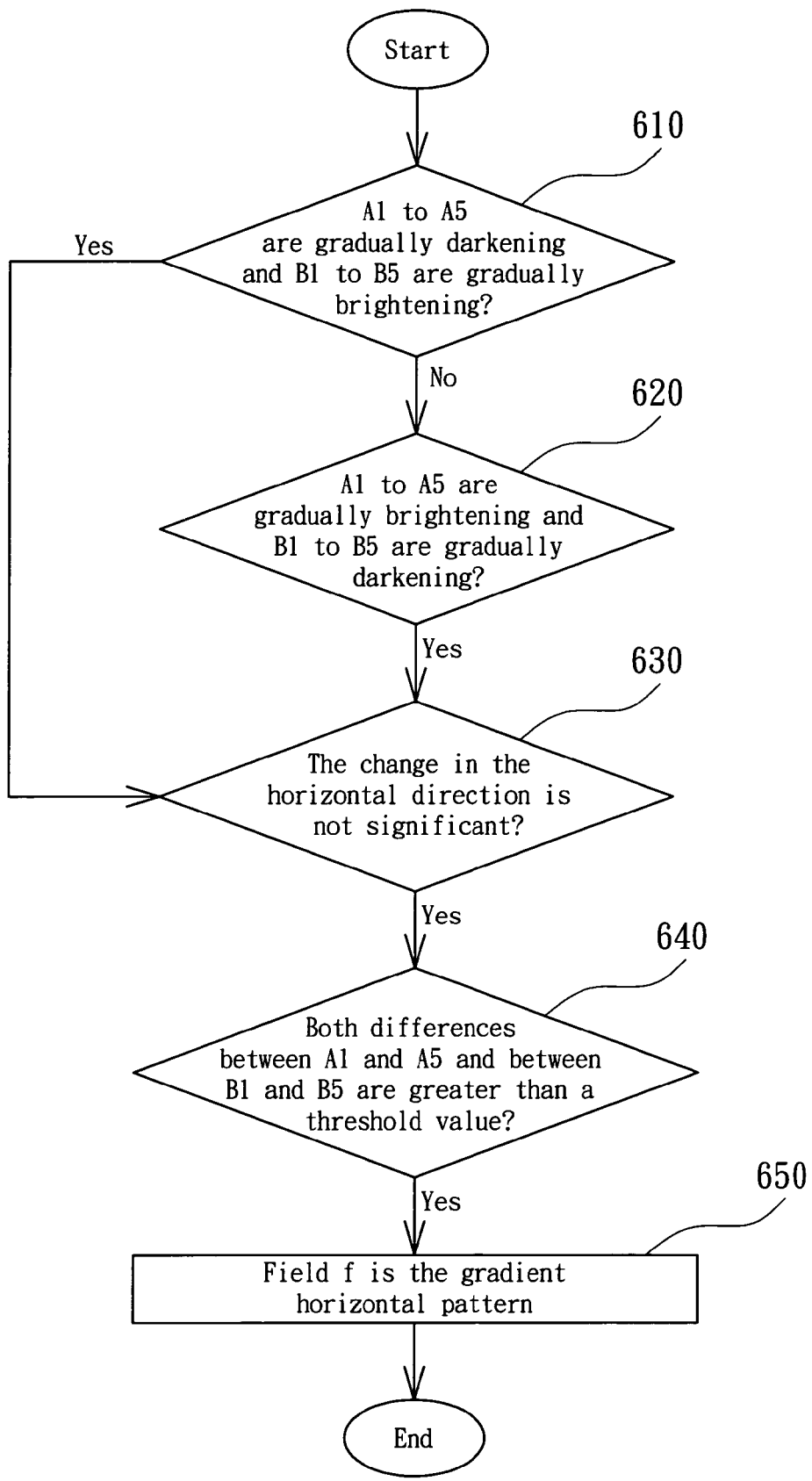
FIG. 6A is a flow chart showing a method for recognizing a first gradient horizontal pattern according to the embodiment of the invention.

FIG. 6A is a flow chart showing a method for recognizing a first gradient horizontal pattern according to the embodiment of the invention. Three conditions must be simultaneously satisfied such that the field has the gradient horizontal pattern. The first condition includes two sub-conditions, as shown in steps 610 and 620, wherein the first condition is established if one of the two sub-condition is established. In step 610, it is checked that whether the luminances of the pixels A1 to A5 are gradually darkening and the luminances of the pixels B1 to B5 are gradually brightening, and the first condition is established if yes. In step 620, it is checked that whether the luminances of the pixels A1 to A5 are gradually brightening and the luminance of the pixels B1 to B5 are gradually darkening, and the first condition is established if yes. If the first condition is established, step 630 is continued to check the second condition.

In step 630, it is checked whether or not the horizontal change is small. The check method is to compute an absolute value of a horizontal adjacent pixel, and all the absolute values of the luminance differences between the adjacent pixels have to be smaller than a threshold value T2. If yes, it represents that the second condition is established (i.e., the horizontal change is not large), step 640 is continued to check the third condition. The threshold value T2 ranges from 30 to 50.

Step 640 is to check the absolute values of the luminance difference between the pixels A1 and A5 and the luminance difference between the pixels B1 and B5, wherein the third condition cannot be established until the both of the absolute values are greater than the threshold value T3. The threshold value T3 ranges from 8 to 12. The second condition is to check the gradual change in the horizontal direction, and the third condition is to check that the difference between the maximum luminances is large enough. If the third condition is also established, the field f has the gradient horizontal pattern (step 650).

Figure 6B:
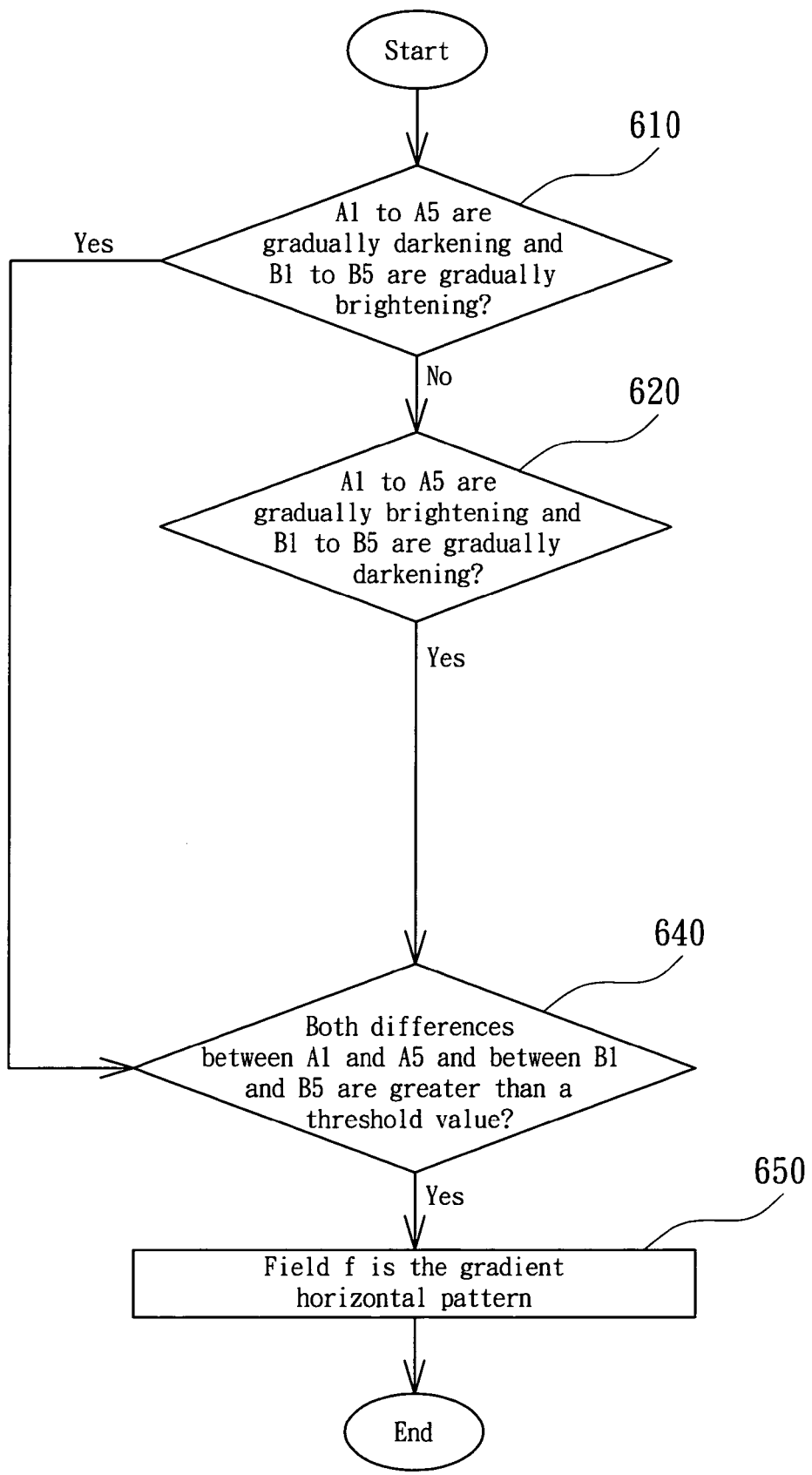
FIG. 6B is a flow chart showing a method for recognizing a second gradient horizontal pattern according to the embodiment of the invention.

FIG. 6B is a flow chart showing a method for recognizing a second gradient horizontal pattern according to the embodiment of the invention, wherein the field f has the gradient horizontal pattern (step 650) only when the first and second conditions are satisfied (i.e., the step 610 or 620 checks that the first condition is established and the step 630 checks that the second condition is established).

Figure 6C:
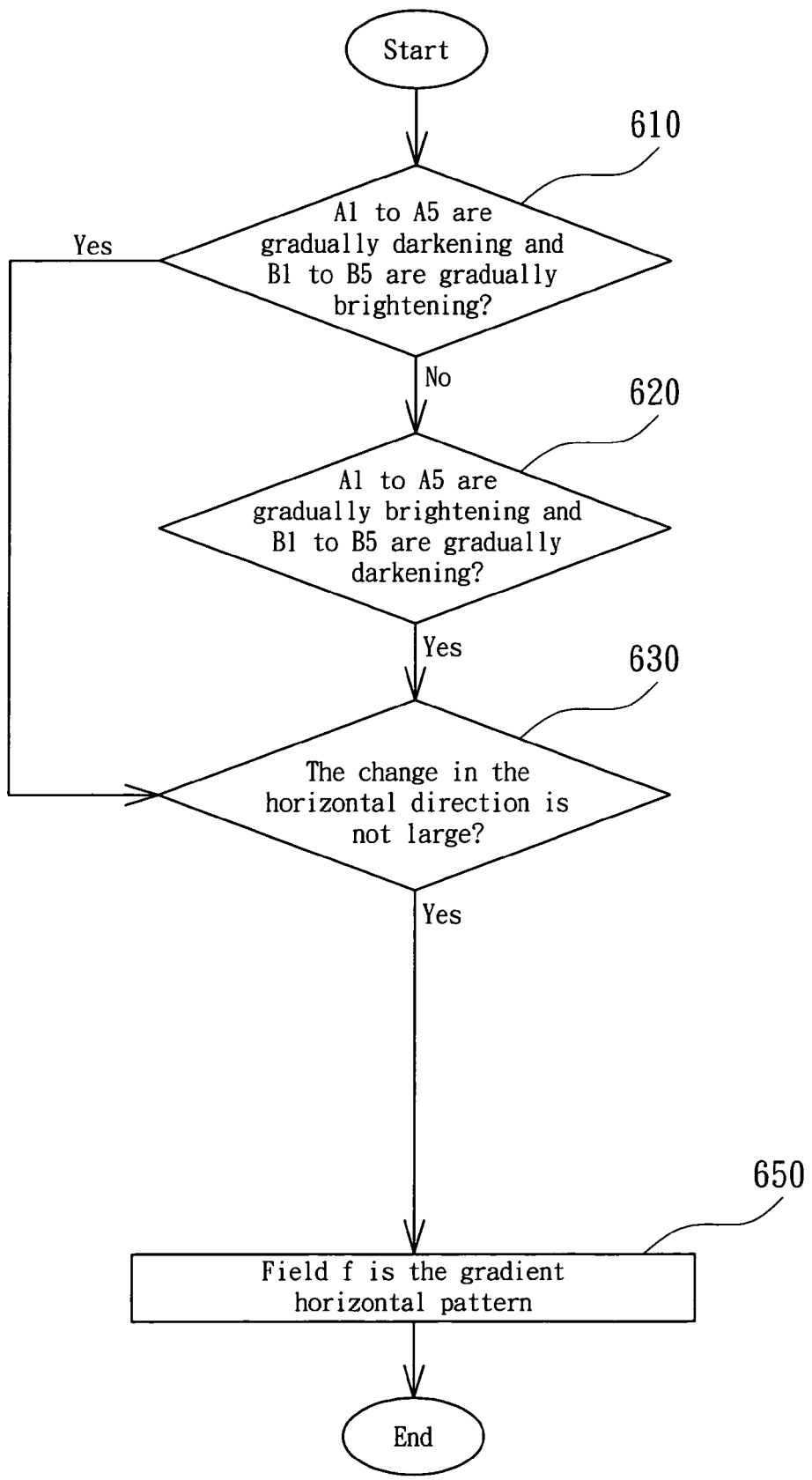
FIG. 6C is a flow chart showing a method for recognizing a third gradient horizontal pattern according to the embodiment of the invention.

FIG. 6C is a flow chart showing a method for recognizing a third gradient horizontal pattern according to the embodiment of the invention, wherein only the first and third conditions have to be satisfied. That is, if the step 610 or 620 checks that the first condition is established and the step 640 checks that the third condition is established, the field f has the gradient horizontal pattern (step 650).

Figure 6D:
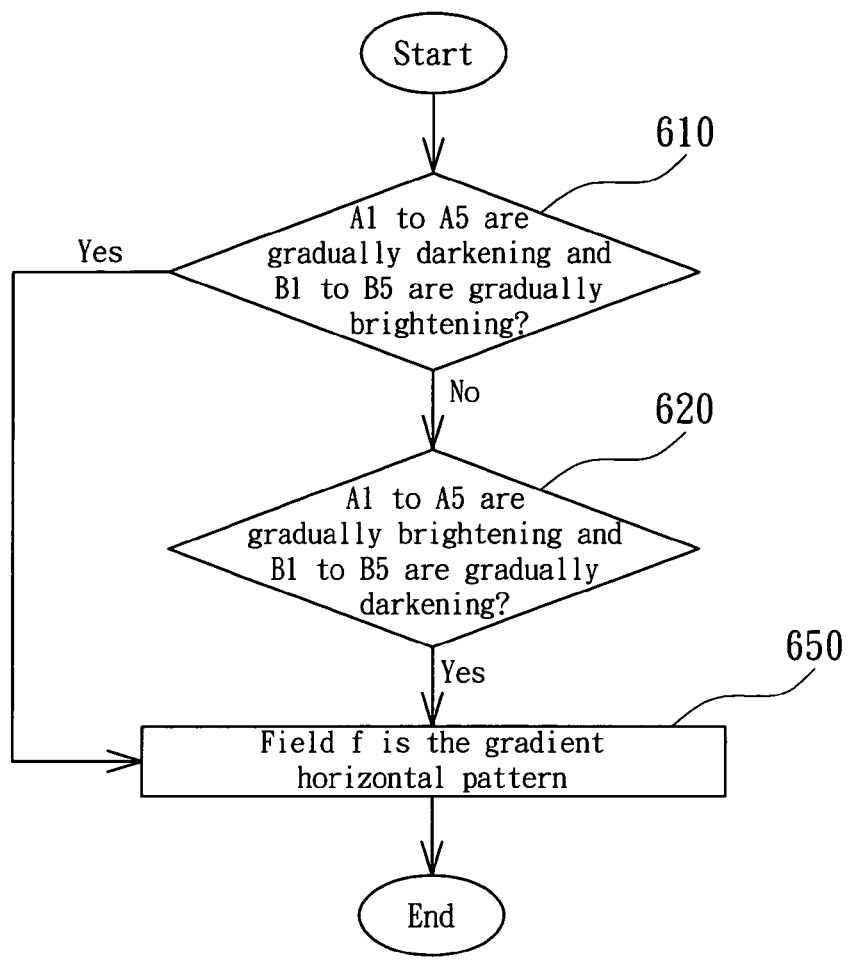
FIG. 6D is a flow chart showing a method for recognizing a fourth gradient horizontal pattern according to the embodiment of the invention.

FIG. 6D is a flow chart showing a method for recognizing a fourth gradient horizontal pattern according to the embodiment of the invention, wherein only the first condition has to be satisfied. That is, if the step 610 or 620 checks that the first condition is established, the field f has the gradient horizontal pattern (step 650).

When the pattern recognizing unit 310 has recognized the obviously horizontal pattern or gradient horizontal pattern, the field f is processed by the first de-interlacing unit 320, or otherwise the field f is processed by the second de-interlacing unit 330.

Figure 7:
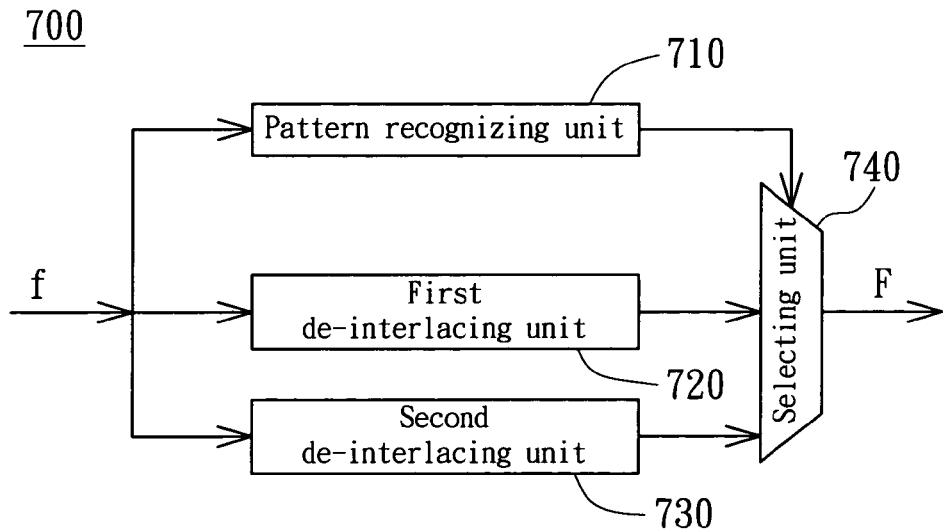
FIG. 7 is a block diagram showing a de-interlacing device according to a second embodiment of the invention.

FIG. 7 is a block diagram showing a de-interlacing device according to a second embodiment of the invention. The de-interlacing device 700 includes a pattern recognizing unit 710, a first de-interlacing unit 720, a second de-interlacing unit 730 and a selecting unit 740. Each of the pattern recognizing unit 710, the first de-interlacing unit 720 and the second de-interlacing unit 730 receives the field f, which is an interlaced image. Both of the first de-interlacing unit 720 and the second de-interlacing unit 730 de-interlace the field f. When the pattern recognizing unit 710 has recognized that the field f has the horizontal pattern as shown in FIG. 2A or 2B, the pattern recognizing unit 710 informs the selecting unit 740 to select image data outputted from the first de-interlacing unit 720 as the image data F outputted from the selecting unit 740, or otherwise to select the image outputted from the second de-interlacing unit 730 as the image F outputted from the selecting unit 740. The informing method includes, without limitation to, that the pattern recognizing unit 710 outputs a selection signal to the selecting unit 740, or that the selecting unit 740 checks or queries a register value of the pattern recognizing unit 710. In other words, the selecting unit 740 selects the image outputted from the first de-interlacing unit 720 as the image F outputted from the selecting unit 740, or selects the image outputted from the second de-interlacing unit 730 as the image F outputted from the selecting unit 740 according to the recognition result of the pattern recognizing unit 710.

The first de-interlacing unit 720 receives the pixel data of the field f and then generates the corresponding de-interlaced image or the corresponding de-interlaced pixel data. The second de-interlacing unit 730 receives the pixel data of the field f and then generates the corresponding de-interlaced image or the corresponding de-interlaced pixel data. The first de-interlacing unit 720 and the second de-interlacing unit 730 utilize different de-interlacing methods.

It is to be noted that instead of all the pixels in the field f, the pattern recognizing unit 710 may also receive a portion of pixels in the field f, which can be used to recognize the horizontal pattern. The outputted image data F may be the de-interlaced image or the corresponding pixel data.

Consequently, the invention further discloses a de-interlacing method for generating a corresponding de-interlaced image or corresponding de-interlaced pixel data according to the pixel data of the field. The method includes the following steps. First, it is recognized that whether or not the pixel data of the field f has a horizontal pattern. The first de-interlacing method is used to de-interlace the pixel data of the field f and thus to generate the first image data, and the second de-interlacing method is used to de-interlace the pixel data of the field f and thus to generate the second image data. Then, the first image data or second image data is selected as the corresponding de-interlaced image or corresponding de-interlaced pixel data according to the result of the recognizing step. The first de-interlacing method and the second de-interlacing method are different. The method for recognizing whether the pixel data of the field f has the horizontal pattern is described with reference to FIGS. 4, 5 and 6A to 6D.

Figure 8:
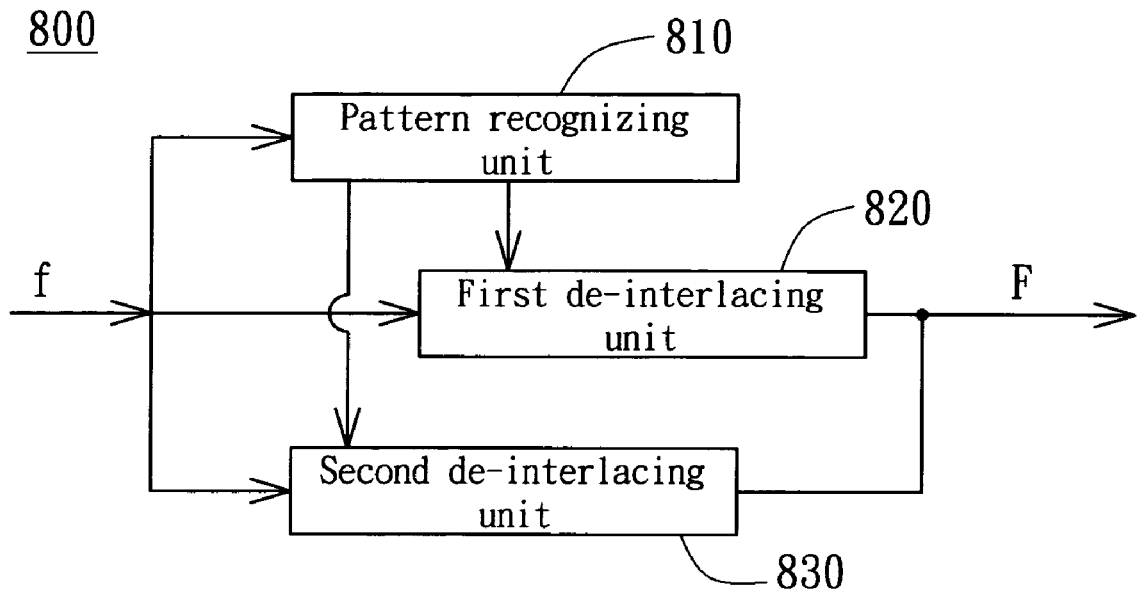
FIG. 8 is a block diagram showing a de-interlacing device according to a third embodiment of the invention.

FIG. 8 is a block diagram showing a de-interlacing device according to a third embodiment of the invention. The de-interlacing device 800 includes a pattern recognizing unit 810, a first de-interlacing unit 820, a second de-interlacing unit 830 and a selecting unit 840. Each of the pattern recognizing unit 810, the first de-interlacing unit 820 and the second de-interlacing unit 830 receives the field f, which is an interlaced image. Both of the first de-interlacing unit 820 and the second de-interlacing unit 830 de-interlace the field f. When the pattern recognizing unit 810 has recognized that the field f has the horizontal pattern as shown in FIG. 2A or 2B, the pattern recognizing unit 810 selects the image F outputted from the first de-interlacing unit 820, or otherwise selects the image F outputted from the second de-interlacing unit 830. The selecting method includes, without limitation to, that the pattern recognizing unit 810 outputs a selection signal, or that the first de-interlacing unit 820 and the second de-interlacing unit 830 check or query the register value of the pattern recognizing unit 810. In other words, the first de-interlacing unit 820 and the second de-interlacing unit 830 select the image F outputted from the first de-interlacing unit 820 and the second de-interlacing unit 830 according to the recognition result of the pattern recognizing unit 810. It is also possible that the first de-interlacing unit 820 and the second de-interlacing unit 830 do not de-interlace the field f first, and the de-interlacing process is performed after the selection.

The first de-interlacing unit 820 receives the pixel data of the field f and then generates the corresponding de-interlaced image or corresponding de-interlaced pixel data. The second de-interlacing unit 830 receives the pixel data of the field f, and then generates the corresponding de-interlaced image or corresponding de-interlaced pixel data. The first de-interlacing unit 820 and the second de-interlacing unit 830 utilize different de-interlacing methods.

It is to be noted that instead of all the pixels in the field f, the pattern recognizing unit 810 may also receive a portion of pixels in the field f, which can be used to recognize the horizontal pattern. The outputted image data F may be the de-interlaced image or the corresponding pixel data.

Consequently, the invention further discloses a de-interlacing method for generating a corresponding de-interlaced image or corresponding de-interlaced pixel data according to the pixel data of the field. The method includes the following steps. First, it is recognized that whether or not the pixel data of the field f has a horizontal pattern. The first de-interlacing method is used to de-interlace the pixel data of the field f and thus to generate the first image data, and the second de-interlacing method is used to de-interlace the pixel data of the field f and thus to generate the second image data. Then, the first image data or second image data is selected as the corresponding de-interlaced image or corresponding de-interlaced pixel data according to the result of the recognizing step. The first de-interlacing method and the second de-interlacing method are different.

Therefore, the invention further discloses another de-interlacing method for generating the corresponding de-interlaced image or corresponding de-interlaced pixel data according to the pixel data of the field f when the first de-interlacing unit 820 and the second de-interlacing unit 830 does not de-interlace the field f until the selection is performed. The method includes the following steps. First, it is recognized that whether or not the pixel data of the field f has a horizontal pattern. If the pixel data of the field f has the horizontal pattern, the pixel data of the field f is de-interlaced into the corresponding de-interlaced image or corresponding de-interlaced pixel data according to a first de-interlacing method; or otherwise the pixel data of the field f is de-interlaced into the corresponding de-interlaced image or corresponding de-interlaced pixel data according to a second de-interlacing method, which is different from the first de-interlacing method.

The method for recognizing whether the pixel data of the field f has the horizontal pattern is described with reference to FIGS. 4, 5 and 6A to 6D.

Figure 9:
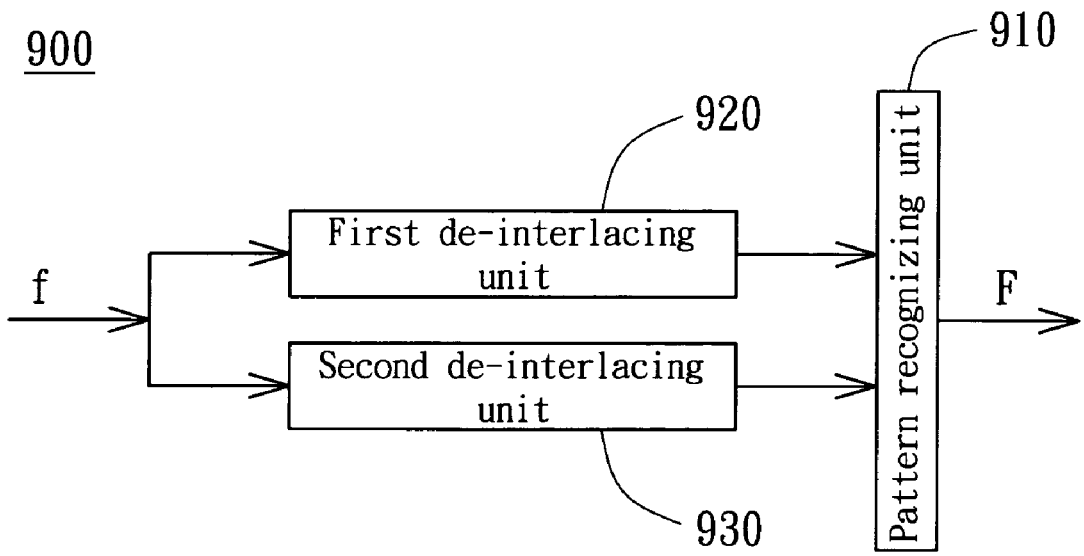
FIG. 9 is a block diagram showing a de-interlacing device according to a fourth embodiment of the invention.

FIG. 9 is a block diagram showing a de-interlacing device according to a fourth embodiment of the invention. The de-interlacing device 900 includes a pattern recognizing unit 910, a first de-interlacing unit 920 and a second de-interlacing unit 930. Both of the first de-interlacing unit 920 and the second de-interlacing unit 930 receive and de-interlace the field f, which is an interlaced image. The pattern recognizing unit 910 receives the images outputted from the first de-interlacing unit 920 and the second de-interlacing unit 930 and recognizes the pixel data of the field f included in the image outputted from the first de-interlacing unit 920. When the pattern recognizing unit 910 has recognized that the field f has the horizontal pattern as shown in FIG. 2A or 2B, the pattern recognizing unit 910 selects the image outputted from the first de-interlacing unit 920 as the image F outputted from the pattern recognizing unit 910, or otherwise selects the image outputted from the second de-interlacing unit 930 as the image F outputted from the pattern recognizing unit 910.

The first de-interlacing unit 920 receives the pixel data of the field f and then generates the corresponding de-interlaced image or corresponding de-interlaced pixel data. The second de-interlacing unit 930 receives the pixel data of the field f and then generates the corresponding de-interlaced image or corresponding de-interlaced pixel data. The first de-interlacing unit 920 and the second de-interlacing unit 930 utilize different de-interlacing methods.

It is to be noted that instead of all the pixels in the field f, the pattern recognizing unit 910 may also receive a portion of pixels in the field f, which can be used to recognize the horizontal pattern, and the outputted image data F may be the corresponding de-interlaced image or corresponding de-interlaced pixel data.

Consequently, the invention further discloses a de-interlacing method for generating a corresponding de-interlaced image or corresponding de-interlaced pixel data according to the pixel data of the field. The method includes the following steps. First, the first de-interlacing method is used to de-interlace the pixel data of the field f into the first image data. The second de-interlacing method is used to de-interlace the pixel data of the field f into the second image data. Next, the first image data and the second image data are received. Then, it is recognized that whether or not the pixel data of the field f included in the first image data and the second image data has the horizontal pattern. Next, the first image data or second image data is selected as the corresponding de-interlaced image or corresponding de-interlaced pixel data according to the recognition result. The first de-interlacing method and the second de-interlacing method are different.

The method for recognizing whether the pixel data of the field f has the horizontal pattern is described with reference to FIGS. 4, 5 and 6A to 6D.

The de-interlacing device having the pattern recognizing unit and the method therefor according to the embodiments of the invention can recognize the property of the interlaced image and properly process the image according to a suitable de-interlacing method. Thus, interlaced images with various properties can be properly processed by suitable de-interlacing methods, and the best image quality can be obtained.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A de-interlacing device for generating data of a plurality of corresponding pixels according to data of a plurality of selected pixels in a field of an interlaced image, the device comprising:
a first de-interlacing unit;
a second de-interlacing unit, wherein the second and first de-interlacing units use different de-interlacing methods; and
a pattern recognizing unit for recognizing whether or not the data of the selected pixels has a special pattern, wherein:
the pattern recognizing unit outputs the data of the selected pixels to the first de-interlacing unit and then the first de-interlacing unit generates the data of the corresponding pixels accordingly if the data of the selected pixels has the special pattern,
the pattern recognizing unit outputs the data of the selected pixels to the second de-interlacing unit and then the second de-interlacing unit generates the data of the corresponding pixels accordingly if the data of the selected pixels does not have the special pattern,
the data of the selected pixels comprises luminance values of the selected pixels, and
the pattern recognizing unit obtains a vertical difference and a horizontal difference according to the luminance values of the selected pixels, and the data of the selected pixels has the special pattern if the vertical difference after being multiplied by a predetermined value is larger than the horizontal difference.

2. The de-interlacing device according to claim 1, wherein the data of the selected pixels is selected from a first horizontal line and a second horizontal line in the field of the interlaced image.

3. The de-interlacing device according to claim 2, wherein:
the vertical difference is obtained according to the luminance values of the selected pixels and an average of the luminance values of the selected pixels; and
the horizontal difference is obtained according to an absolute difference between the luminance value of each of the selected pixels and its horizontal adjacent pixel.

4. The de-interlacing device according to claim 2, wherein:
the data of the selected pixels comprises luminance values of the selected pixels;
the pattern recognizing unit checks whether or not the data of the selected pixels has the special pattern according to the luminance values of the selected pixels;
the data of the selected pixels has the special pattern if the selected pixels of the first horizontal line are arranged in a gradually darkening manner, and the selected pixels of the second horizontal line are arranged in a gradually brightening manner; and
the data of the selected pixels has the special pattern if the selected pixels of the first horizontal line are arranged in the gradually brightening manner and the selected pixels of the second horizontal line are arranged in the gradually darkening manner.

5. A de-interlacing device for generating data of a plurality of corresponding pixels according to data of a plurality of selected pixels in a field of an interlaced image, the device comprising:
a first de-interlacing unit;
a second de-interlacing unit, wherein the second and first de-interlacing units use different de-interlacing methods; and
a pattern recognizing unit for recognizing whether or not the data of the selected pixels has a special pattern, for selecting the first de-interlacing unit to generate the data of the corresponding pixels if the data of the selected pixels has the special pattern, and for selecting the second de-interlacing unit to generate the data of the corresponding pixels if the data of the selected pixels does not have the special pattern, wherein
the data of the selected pixels includes luminance values of the selected pixels, and
the pattern recognizing unit obtains a vertical difference and a horizontal difference according to the luminance values of the selected pixels, and the data of the selected pixels has the special pattern if the vertical difference after been multiplied by a predetermined value is larger than the horizontal difference.

6. The de-interlacing device according to claim 5, wherein each of the first de-interlacing unit, the second de-interlacing unit and the pattern recognizing unit receives the data of the selected pixels.

7. The de-interlacing device according to claim 5, wherein the data of the selected pixels is selected from a first horizontal line and a second horizontal line in the field of the interlaced image.

8. The de-interlacing device according to claim 7, wherein:
the vertical difference is obtained according to the luminance values of the selected pixels and an average of the luminance values of the selected pixels; and
the horizontal difference is obtained according to an absolute difference between the luminance values of each of the selected pixels and its horizontal adjacent pixel.

9. The de-interlacing device according to claim 7, wherein:
the data of the selected pixels comprises luminance values of the selected pixels;
the pattern recognizing unit checks whether or not the data of the selected pixels has the special pattern according to the luminance values of the selected pixels;
the data of the selected pixels has the special pattern if the selected pixels of the first horizontal line are arranged in a gradually darkening manner, and the selected pixels of the second horizontal line are arranged in a gradually brightening manner; and
the data of the selected pixels has the special pattern if the selected pixels of the first horizontal line are arranged in the gradually brightening manner and the selected pixels of the second horizontal line are arranged in the gradually darkening manner.

10. A de-interlacing method for generating data of a plurality of corresponding pixels according to data of a plurality of selected pixels in a field of an interlaced image, the method comprising the steps of:
recognizing whether or not the data of the selected pixels has a special pattern;
de-interlacing the data of the selected pixels into the data of the corresponding pixels according to a first de-interlacing method if the data of the selected pixels has the special pattern; and
de-interlacing the data of the selected pixels into the data of the corresponding pixels according to a second de-interlacing method, which is different from the first de-interlacing method, if the data of the selected pixels does not have the special pattern, wherein:
the data of the selected pixels includes luminance values of the selected pixels; and
the recognizing step obtains a vertical difference and a horizontal difference according to the luminance values of the selected pixels, and the data of the selected pixels has the special pattern if the vertical difference after been multiplied by a predetermined value is greater than the horizontal difference.

11. The method according to claim 10, wherein the data of the selected pixels is selected from a first horizontal line and a second horizontal line in the field of the interlaced image.

12. The method according to claim 11, wherein the first horizontal line is adjacent to the second horizontal line, and the selected pixels are correspondingly arranged on the first horizontal line and the second horizontal line.

13. The method according to claim 11, wherein the step of obtaining the vertical difference comprises:
calculating an average of the luminance values of the selected pixels;
assigning a quantization value of each of the selected pixels according to the luminance values of the selected pixels and the average;
calculating a plurality of quantization differences, each of which is an absolute difference between the quantization values of the vertically oppositely selected pixels; and
summating the quantization differences into the vertical difference.

14. The method according to claim 11, wherein the step of obtaining horizontal difference comprises:
calculating a plurality of first order differentials according to an absolute difference between the luminance values of each of the selected pixels and its horizontal adjacent pixel;
calculating a plurality of second order differentials according to each of the first order differentials;
summating the second order differentials into the horizontal difference.

15. The method according to claim 11, wherein:
the data of the selected pixels comprises luminance values of the selected pixels;
the recognizing step checks whether or not the data of the selected pixels has the special pattern according to the luminance values of the selected pixels;
the data of the selected pixels has the special pattern if the selected pixels of the first horizontal line are arranged in a gradually darkening manner, and the selected pixels of the second horizontal line are arranged in a gradually brightening manner; and
the data of the selected pixels has the special pattern if the selected pixels of the first horizontal line are arranged in the gradually brightening manner and the selected pixels of the second horizontal line are arranged in the gradually darkening manner.

16. The method according to claim 15, wherein the recognizing step further checks a luminance difference between each of the selected pixels and its adjacent pixel of the first horizontal line and the second horizontal line, and the data of the selected pixels has the special pattern if each of the luminance difference is smaller than a second threshold value.

17. The method according to claim 15, wherein the recognizing step further checks a first luminance difference between two pixels of the selected pixels of the first horizontal line, which are farthest away from each other, and a second luminance difference between two pixels of the selected pixels of the second horizontal line, which are farthest away from each other, and the data of the selected pixels has the special pattern if each of the first and second luminance differences is greater than a third threshold value.

* * * * *